Jan. 2, 1968  E. J. THOMAS ETAL  3,361,998
SUPERCONDUCTING MAGNETS
Filed June 22, 1966
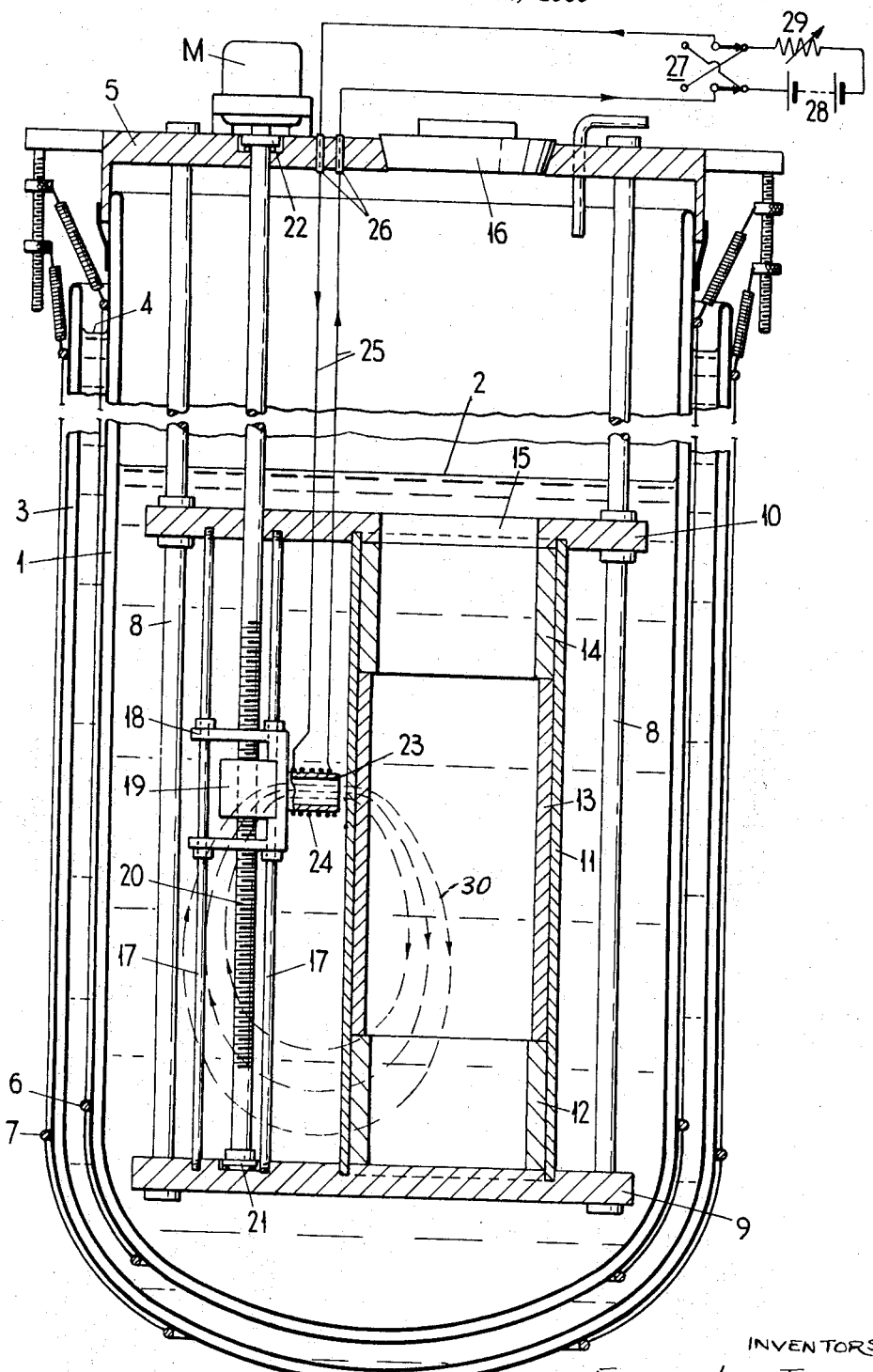
INVENTORS
EDWARD JOHN THOMAS
MICHAEL WILLIAMS
BY Kinchlein, Linchlein & Ottinger
ATTORNEYS 3,361,998
SUPERCONDUCTING MAGNETS
Edward John Thomas, Cheadle, and Michael Williams, Watford, England, assignors to The General Electric Company Limited, London, England, a British company
Filed June 22, 1966, Ser. No. 560,971
Claims priority, application Great Britain, June 23, 1965, 26,583/65
4 Claims. (Cl. 335—216)

ABSTRACT OF THE DISCLOSURE

A hard superconducting tube is magnetised by cooling it to below the critical temperature, applying a magnetic field to render normal an area of the tube wall and allow magnetic flux to pass through this area to the tube interior, traversing the field and associated normal area from end to end of the tube to establish interior flux along the whole tube length, and removing the field to leave the flux trapped within the tube, the process being repeated as desired to build up the flux density.

---

This invention relates to superconducting magnets, that is to say to bodies formed of superconducting material maintained below the critical temperature whilst carrying circulating electric currents which set up the magnetic fields by virtue of which the bodies act as magnets.

Such magnets can be of very high field strength and have hitherto usually been made in the form of coils of hard superconductive metal wire, such as niobium/tin intermetallic compound.

We have now appreciated that a superconducting magnet in the form of a hollow tube carrying electric currents circulating round the tube axis, so as in effect to constitute a single turn solenoid, would possess several advantages. Thus such a magnet could be prepared by powder metallurgy techniques, which renders a wider choice of material available since ductility (for drawing into wire) is no longer a requirement. Also the material can be made porous, which enhances cooling and reduces the likelihood of "flux jumping" when the magnet is subject to field changes, whilst the packing fraction may be better than with wirewound magnets and less material may be needed for producing a given field since the current is concentrated close to the bore of the magnet.

However, there is a difficulty with such magnets in that there are no terminals through which the magnet can be energised (i.e. the necessary circulating electric currents set up) and the main object of the invention is to overcome this difficulty.

According to the invention, a superconducting magnet is formed from a hollow tube of hard superconducting material by subjecting a relatively small area of the tube wall, whilst the tube is maintained below the critical temperature of the material, to an external localised magnetic field transverse to the wall and of sufficient strength to result in the magnetic flux penetrating the tube wall, and causing the localised area to traverse the length of the tube, with subsequent removal of the localised field, so that magnetic flux parallel to the tube axis is trapped within the tube interior and electric currents are set up in the tube wall which circulate round the tube axis and persist when the localised field is removed. The term hard superconducting material means hardness in the superconducting magnetic sense, that is to say, the material shows hysteresis, and can carry denser currents in higher fields than the so-called soft superconductors, which are in general superconducting elements.

The circulating electric currents can be increased, up to the critical limit at which the tube material remains superconductive, by repeated traverses of the localised magnetic field in the same direction along the tube wall, or in the opposite direction with reversal of the localised magnetic field.

The invention depends for its success on the localised magnetic field turning normal each of the small areas of the tube wall on which it impinges during the relative movement of the field so as to permit the magnetic flux to pass to the interior of the tube through the area, which areas revert to the superconductive condition as the magnetising field moves away so that the flux passing to the tube interior is trapped therein.

The localised magnetic field can be produced by a relatively small superconducting magnet of hard superconductive material (which might itself consist of a single-turn solenoid formed from a magnetised tube of sintered superconductive material) presented to the tube wall with its axis substantially at right angles to the tube axis.

For example, the small magnet may be moved along the outside surface of the tube and at a rate such that the magnetic change in each successive cooperating small area of the tube is sufficient to turn the area normal but not such as to cause the normality to persist and result in the production of a long normal strip extending along the length of the tube.

The effect of the external moving field might in some cases be assisted by an external heat source irradiating the tube wall where the field of the small magnet is intended to cut the wall, or insulated heater wires embedded in the tube wall could be arranged to be energised in turn as they are reached by the field of the small magnet so as to facilitate penetration of the wall by the field of the small magnet.

In some cases a cooling jet of gas or liquid (helium) may be arranged to follow the movement of the small magnet so as immediately to bring back to the superconducting state the small areas turned normal by the magnet.

In some cases the penetration of the localised magnetic field might be enhanced by causing the small magnet to vibrate in the direction of motion, but it might then need to be shielded, for example by an internal copper shield, to reduce the risk of it being turned normal by its own flux vibration. Cooling of the small magnet (for example by liquid helium pumped under high pressure through its pores when in a sintered form) might also be employed for the same purpose.

Heating of the small areas of the tube wall might not be necessary if the localised magnetising field is sufficiently strong, or its action assisted. Thus, for enhancing the effect of the small superconducting magnet, a small solenoid, for example of copper wire, may in some cases be arranged opposite it within the interior of the tube to be magnetised, and this auxiliary solenoid supplied with alternating current, or large current pulses, so as to help the field of the small external magnet penetrate the tube wall.

The tube may also be arranged to rotate relatively to the small superconducting magnet during the longitudinally traverses of the latter, so as to spread the mechanical stresses in the tube wall and help keep the overall tube temperature even. The tube and magnetising magnet (with auxiliary internal solenoid if present) must, of course, be supported during the magnetising process so as to contain them against the magnetic interaction forces.

By way of example, the tube to be magnetised may be formed of 200 mesh niobium and tin powders mixed to give the approximate composition $Nb_3Sn$, compacted into the required tubular form at 10 tons/in.$^2$ pressure, and sintered at 925° C. for 2 hours in an argon atmosphere to form the tube.

The tube dimensions may be, for example, mean internal diameter 8 cms., wall thickness ½ cm., length 40 cms., and a suitable magnetising magnet, of the same material, would then be of mean internal diameter 3 mms., length 6 cms., and magnetised to give, say 100 koe. at its centre.

Preferably, however, there is used a wire solenoid of superconducting material arranged to produce a similar magnetising field, since the direction of this field can then be reversed simply by reversing the direction of the electric current when reversing the direction of travel of the solenoid.

The invention will be further described with reference to the accompanying drawing, which shows in part-sectional elevation (partly broken away for reducing the drawing length), one form of apparatus for carrying it out.

The drawing shows a double-walled cryostat consisting of an internal evacuated hollow-wall vessel 1, filled with liquid helium to the depth indicated by the line 2, contained within an outer evacuated hollow-wall vessel 3 filled with liquid nitrogen to the depth indicated by the line 4. The two vessels are suspended from an upper lid and support metal cover 5 by means of wire basket and spring support means 6 and 7.

Suspended within the inner vessel 1 from the cover 5 is a framework consisting of vertical stainless steel tubes 8 which carry a horizontal lower brass platform 9 and an upper horizontal brass partition 10.

A thin-walled non-magnetic steel tube 11 is spigotted at each end into anular recesses in the platform 9 and partition 10, and at its lower end closely surrounds a brass tube 12 also spigotted into the platform 9.

The tube 13 of superconducting material to be magnetised rests within the steel tube 11 on the upper end of the tube 12 and is held in position by an upper brass tube 14 which is clamped down by the fixing of the partition 10 to the tubes 8. The relative diameters of the tubes 11 and 13 are chosen so that the steel tube 11 exerts a slight inward pressure on the superconducting tube 13 when fully cooled in the cryostat and supports it against the outward magnetic forces arising on magnetisation.

The partition 10 is provided with an aperture 15 around the end of the tube 14, and immediately above this aperture the cover 5 is fitted with an access seal-plug 16 for enabling specimens to be inserted within the interior of the superconducting tube 13.

A system of vertical steel guide rods 17 is fixed between the partition 10 and platform 9 to one side of the steel tube 11, and a solenoid carriage 18 is arranged to travel along these guide rods. The drive for the carriage is provided by a threaded steel nut 19 fixed to the carriage and through which nut passes a threaded rotatable steel drive rod 20 supported at its lower end in a bearing 21 carried by the platform 9 and at its upper end in a bearing 22 carried by the cover 5. The upper and outer end of the drive rod 20 is coupled to a slow running reversible electric motor M.

The carriage 18 has a small brass tube 23 projecting horizontally therefrom towards the steel tube 11 and a solenoid 24 of superconducting wire is fixed round the tube 23 so that the end of the solenoid closely approaches the tube 11.

The ends of the solenoid 24 are connected through copper wires 25 which pass through bushings 26 in the cover 5 to an external reversing switch 27 which is itself connected to an electric direct current source 28 and control resistor 29.

In use of the apparatus, after assembly with the superconducting tube 13 fixed in position and cooled down to the superconducting state, an electric current is passed through the solenoid 24 so as to produce a localised magnetic field of sufficient strength to render normal a small area of the tube wall and to cause flux to penetrate through the walls of the tubes 11 and 13 in this area as indicated by the arrowed flux lines 30.

The motor M is at the same time energised to rotate the threaded rod 20 and cause the carriage to carry the solenoid 24 along the side of the steel tube 10, and past one end; the solenoid current is then switched off, whereupon circulating electric currents are set up round the walls of the super-conducting tube 13 to conserve the magnetic flux, which is thereby trapped within the tube 13.

At the end of each traverse of the solenoid 24 past the end of the tube 13, the switch 27 is operated first to switch off and then to reverse the electric current flowing through the solenoid so to reverse the solenoid polarity, and the motor M is also reversed to cause the solenoid to traverse the tube 13 in the opposite direction, thereby injecting further magnetic flux within the tube 13, this process being repeated until the required intensity of magnetic field within the tube 13 has been built up.

In this example the tube 13 is intended to remain in position within the cryostat to provide a working space within the tube into which specimens can be inserted to be influenced by the very high intensity magnetic field which permeates the space.

We claim:

1. A method of magnetising a tube of hard superconducting material comprising the steps of maintaining the tube below the critical temperature of the material, subjecting a relatively small area of the tube wall to an external localised magnetic field transverse to the wall and of sufficient strength to result in a magnetic flux that penetrates the tube wall, causing the localised area to traverse the length of the tube, and subsequently removing of the localised field, so that magnetic flux parallel to the tube axis is trapped within the tube interior and electric currents are set up within the tube wall which circulate around the tube axis and persist when the localised field is removed.

2. A method according to claim 1, wherein the localised area of magnetic flux penetration is caused to traverse the length of the tube repeatedly so as to progressively increase the magnetisation of the tube.

3. A method according to claim 2, wherein the localised area of magnetic flux penetration is caused to traverse the length of the tube successively in opposite directions with reversal of the direction of the localised magnetic field with each reversal of the direction of traverse.

4. A method according to claim 3, wherein the localised magnetic field is produced by a relatively small solenoid of superconducting wire and the reversal of the direction of the localised magnetic field is effected by reversal of the direction of electric current flow through the solenoid.

References Cited

UNITED STATES PATENTS

| | | | |
|---|---|---|---|
| 3,252,018 | 5/1966 | Drautman | 335—216 XR |
| 3,336,548 | 8/1967 | Atherton | 335—216 |

BERNARD A. GILHEANY, *Primary Examiner.*

GEORGE HARRIS, *Examiner.*